United States Patent
Dai et al.

(10) Patent No.: US 8,176,016 B1
(45) Date of Patent: May 8, 2012

(54) METHOD AND APPARATUS FOR RAPID IDENTIFICATION OF COLUMN HETEROGENEITY

(75) Inventors: Bing Tian Dai, Singapore (SG); Nikolaos Koudas, Toronto (CA); Beng Chin Ooi, Singapore (SG); Divesh Srivastava, Summit, NJ (US); Suresh Venkatasubramanian, Salt Lake City, UT (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 77 days.

(21) Appl. No.: 11/601,416

(22) Filed: Nov. 17, 2006

(51) Int. Cl.
G06F 7/00 (2006.01)
G06F 17/00 (2006.01)

(52) U.S. Cl. ......................... 707/688; 707/737

(58) Field of Classification Search .................. 707/200, 707/202–204, 10
See application file for complete search history.

(56) References Cited

U.S. PATENT DOCUMENTS

| | | | |
|---|---|---|---|
| 5,195,167 A * | 3/1993 | Bahl et al. | 704/200 |
| 5,825,978 A * | 10/1998 | Digalakis et al. | 704/256 |
| 6,026,398 A * | 2/2000 | Brown et al. | 707/5 |
| 6,131,082 A * | 10/2000 | Hargrave et al. | 704/7 |
| 6,317,707 B1 * | 11/2001 | Bangalore et al. | 704/9 |
| 6,360,019 B1 * | 3/2002 | Chaddha | 382/253 |
| 6,421,467 B1 * | 7/2002 | Mitra | 382/240 |
| 6,633,882 B1 * | 10/2003 | Fayyad et al. | 1/1 |
| 6,654,743 B1 * | 11/2003 | Hogg et al. | 707/7 |
| 6,782,357 B1 * | 8/2004 | Goodman et al. | 704/9 |
| 6,834,278 B2 * | 12/2004 | Yu et al. | 707/2 |
| 6,862,559 B1 * | 3/2005 | Hogg | 703/2 |
| 6,928,448 B1 * | 8/2005 | Franz et al. | 707/102 |
| 7,024,422 B2 * | 4/2006 | Abdo | 707/102 |
| 7,296,011 B2 * | 11/2007 | Chaudhuri et al. | 707/3 |
| 7,328,201 B2 * | 2/2008 | D'Ambrosio | 706/52 |
| 7,346,601 B2 * | 3/2008 | Chaudhuri et al. | 1/1 |
| 7,353,226 B2 * | 4/2008 | Coen et al. | 707/6 |
| 7,454,411 B2 * | 11/2008 | Birdwell et al. | 707/3 |
| 7,502,765 B2 * | 3/2009 | Kummamuru et al. | 706/15 |
| 7,502,971 B2 * | 3/2009 | Cohen et al. | 714/45 |
| 7,640,220 B2 * | 12/2009 | Acharya | 706/45 |
| 2002/0042793 A1 * | 4/2002 | Choi | 707/6 |
| 2002/0059029 A1 * | 5/2002 | Todder et al. | 702/19 |
| 2002/0128821 A1 * | 9/2002 | Ehsani et al. | 704/10 |
| 2004/0111253 A1 * | 6/2004 | Luo et al. | 704/4 |
| 2004/0111438 A1 * | 6/2004 | Chitrapura et al. | 707/200 |
| 2004/0267713 A1 * | 12/2004 | Chaudhuri et al. | 707/3 |
| 2005/0027717 A1 * | 2/2005 | Koudas et al. | 707/100 |

(Continued)

FOREIGN PATENT DOCUMENTS

JP     2005267079     * 9/2005

OTHER PUBLICATIONS

Navarro G., A Guided Tour to Approximate String Matching, Mar. 2001, ACM, vol. 33, Issue 1, pp. 31-88.*

*Primary Examiner* — Charles Kim
*Assistant Examiner* — Jessica N Le

(57) ABSTRACT

A method and apparatus for rapid identification of column heterogeneity in databases are disclosed. For example, the method receives data associated with a column in a database. The method computes a cluster entropy for the data as a measure of data heterogeneity and then determines whether said data is heterogeneous in accordance with the cluster entropy.

16 Claims, 5 Drawing Sheets

U.S. PATENT DOCUMENTS

| | | |
|---|---|---|
| 2006/0212288 A1* | 9/2006 | Sethy et al. .................. 704/10 |
| 2006/0242142 A1* | 10/2006 | Coen et al. ..................... 707/6 |
| 2006/0282456 A1* | 12/2006 | Kapoor et al. ............... 707/102 |
| 2006/0290539 A1* | 12/2006 | Tomic ............................. 341/50 |
| 2007/0083513 A1* | 4/2007 | Cohen et al. ..................... 707/6 |
| 2007/0143235 A1* | 6/2007 | Kummamuru et al. ......... 706/15 |
| 2008/0027930 A1* | 1/2008 | Bohannon et al. ............... 707/6 |

* cited by examiner

| CUSTOMER_ID |
|---|
| lkjkjjk@321.zzz.info |
| h8742@yyy.com |
| kkjj+@haha.org |
| qwerty@keyboard.us |
| 555-1212@fax.in |
| alpha@beta.ga |
| john.smith@noname.org |
| jane.doe@1973law.us |
| gwb.dc@universe.gov |
| jamesbond.007@action.com |

210

| CUSTOMER_ID |
|---|
| lkjkjjk@321.zzz.info |
| h8742@yyy.com |
| kkjj+@haha.org |
| qwerty@keyboard.us |
| 555-1212@fax.in |
| (908)-555.1234 |
| 973-360-0000 |
| 360-0007 |
| 8005551212 |
| (877)-807-4596 |

212

| CUSTOMER_ID |
|---|
| lkjkjjk@321.zzz.info |
| h8742@yui.com |
| kkjj+@haha.org |
| qwerty@keyboard.us |
| 555-1212@fax.in |
| alpha@beta.ga |
| john.smith@noname.org |
| jane.doe@1973law.us |
| gwb.dc@universe.gov |
| (877)-807-4596 |

214

| CUSTOMER_ID |
|---|
| 123-45-6789 |
| 135-79-2468 |
| 159-24-6837 |
| 789-12-3456 |
| 987-65-4321 |
| (908)-555.1234 |
| 973-360-0000 |
| 360-0007 |
| 8005551212 |
| (877)-807-4596 |

METHOD AND APPARATUS FOR RAPID IDENTIFICATION OF COLUMN HETEROGENEITY

The present invention relates generally to communication networks and, more particularly, to a method and apparatus for rapid identification of column heterogeneity in databases.

BACKGROUND OF THE INVENTION

Businesses and consumers rely on their communications infrastructure for accessing and sharing information. The information or data can be organized and kept in records for ease of access by multiple users or applications. When the collection of information is organized in electronically accessible records, it is managed and updated by computers. These electronically accessible records are commonly referred to as operational databases. The databases are accessed and modified by an increasing number of applications. Each application may make modification based on its own need. When businesses merge or simplify their business processes, the new business model often requires integrating the various applications. The databases are then combined into a common database. The corresponding columns in the common database may contain various types of values. The modifications by various applications and the integration of applications may cause the databases to contain a great deal of heterogeneity. The heterogeneity creates a data quality issue that may prevent applications from being able to access and utilize the data. Thus, knowing the quality of the data in the database may improve the performance of various applications that depend on the accuracy of the data in the database.

Therefore, there is a need for a method that enables rapid identification of column heterogeneity in databases.

SUMMARY OF THE INVENTION

In one embodiment, the present invention discloses a method and apparatus for providing rapid identification of column heterogeneity in databases, e.g., databases that are used in networks. For example, the method receives data associated with a column in a database. The method computes a cluster entropy for the data as a measure of data heterogeneity and then determines whether said data is heterogeneous in accordance with the cluster entropy.

BRIEF DESCRIPTION OF THE DRAWINGS

The teaching of the present invention can be readily understood by considering the following detailed description in conjunction with the accompanying drawings, in which:

FIG. 2 illustrates illustrative homogeneous and heterogeneous database columns;

To facilitate understanding, identical reference numerals have been used, where possible, to designate identical elements that are common to the figures.

DETAILED DESCRIPTION

The present invention broadly discloses a method and apparatus for rapid identification of column heterogeneity on databases, e.g., databases that are used by networks. Although the present invention is discussed below in the context of packet networks, the present invention is not so limited. Namely, the present invention can be applied to other networks such as the Time Division Multiplexed (TDM) and cellular networks. In fact, the present invention can be applied to any databases as used by applications in various fields, e.g., financial applications, medical applications, and so on.

Figure 1:
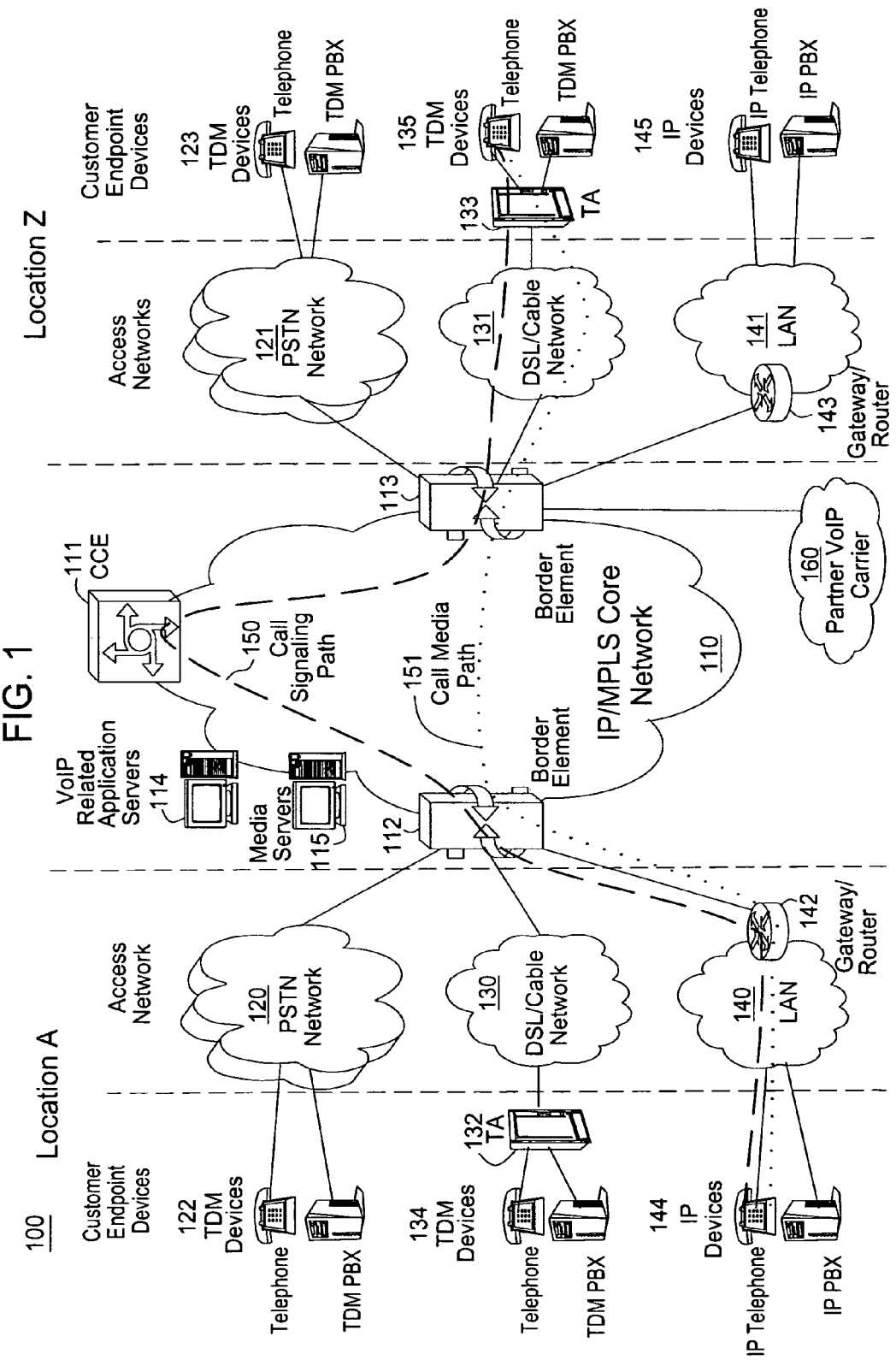
FIG. 1 illustrates an exemplary network related to the present invention.

To better understand the present invention, FIG. 1 illustrates an exemplary network 100, e.g., a packet network such as a VoIP network related to the present invention. Exemplary packet networks include Internet protocol (IP) networks, Asynchronous Transfer Mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted as limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and/or router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that requires certain service specific features, e.g. translation of an E.164 voice network address into an IP address and so on. For calls that originate or terminate in a different carrier, they can be handled through the PSTN 120 and 121 or the Partner IP Carrier 160 interconnections. A customer in location A using any endpoint device type with its associated access network type can communicate with another customer in location Z using any endpoint device type with its associated network type.

The above IP network is described only to provide an illustrative environment in which very large amount of information (customer records, call records, billing records, and so on) is generated and transmitted and databases are often utilized to support services provided on the communication networks. For example, the information or data is organized and kept in records for ease of access by multiple users or applications. When the collection of information is organized in electronically accessible records, it is managed and updated by computers. These electronically accessible records are known as operational databases. The databases are accessed and modified by an increasing number of applications. Each application may make modification based on its own need. When businesses merge or simplify their business processes, the new business model often requires integrating the various applications and databases. As such, the corresponding columns in the databases from multiple applications are then merged into a common database that may contain various types of values.

For example, two independently developed inventory applications may use machine host names such as abc.def.edu and Internet Protocol (IP) addresses such as 105.205.105.205 for the equivalent task of identifying machines connected to a network. If the databases supporting these two different applications are merged into a common database, then the corresponding columns in the database will then contain both host names and IP addresses. This example illustrates that the modifications to the databases made by various applications and the integration of applications themselves may quickly cause the databases to contain a great deal of heterogeneity. The heterogeneity creates a data quality issue that may prevent applications from being able to properly access and utilize the data. Furthermore, repeated modifications of software applications may be necessary to ensure that the software applications will be able to interpret and to access the multiple types of data as the heterogeneity increases over time. Thus, the data quality problems may severely degrade business practices and result in monetary losses. Therefore, there is a need for a method that enables rapid identification of column heterogeneity in databases.

FIG. 2 illustrates an illustrative database 200 with various possible homogeneous or heterogeneous columns 210-216. For example, the database 200 may be accessed by multiple applications and/or servers such as BEs, CCE, application servers, media servers, etc. For the example, each one of the columns 210, 212, 214 and 216 may contain customer identifications. However, the columns contain different types of values for the customer identifications. For example, column 210 contains email addresses. Column 212 contains email addresses and telephone numbers in approximately equal quantities. Column 214 contains mainly email addresses with a few phone numbers. Column 216 contains numerical identifications such as telephone numbers and numbers assigned to each customer (e.g., Social Security Numbers).

In the above example illustrated in FIG. 2, various types of values (email addresses, phone numbers, social security numbers, circuit identifiers, IP addresses, machine domain names, customer names, etc.) may be represented as strings in a column, with no a priori characterization of the set of possible types present. Those skilled in the art would realize heterogeneity is a numerical quantity rather than a Boolean (yes or no) notion. The more types of values there are in a database column, the greater is its heterogeneity. For example, a column with email addresses and phone numbers (e.g., column 212) can be said to be more heterogeneous than a column with only email addresses (e.g., column 210) or only phone numbers. The different types of values in a database column may occur with different frequencies. The presence of a small number of "outliers" does not significantly affect the overall heterogeneity of a column.

More generally, the relative distribution of the types of values in a column impacts the heterogeneity. For example, a column with roughly equal numbers of email addresses and phone numbers (e.g., column 212) can be said to be more heterogeneous than a column that has mainly email addresses with just a few phone numbers (e.g., column 214), or vice versa. If the values in a database are multiple types but one can determine the type of data with ease, then the data are said to be well-separated. For example, if the values are email addresses and phone numbers, the data is well-separated and one can determine which values are email addresses and which values are phone numbers. However, the different types of values may either overlap (e.g., social security numbers and phone numbers) or be well-separated (e.g., email addresses and phone numbers). Thus, there is uncertainty in declaring a column as being heterogeneous. It may be prudent to be conservative about a declaration of heterogeneity if the resulting action is a potentially expensive analysis of the legacy applications that access this database. Generally, the more well-separated are the different types of values in a column, the greater is the heterogeneity.

For example, a column with roughly equal numbers of email addresses and phone numbers (e.g., column 212) can be said to be more heterogeneous than a column with roughly equal numbers of phone numbers and social security numbers (e.g., column 216), due to the greater similarity between the values in the latter case. In one embodiment, a first approach to overcoming these difficulties is to use clustering. Clustering refers to grouping values in a database column based on similarities, such that the number of different types of values in the data may be determined. A method for determining the correct number of clusters will be discussed below.

It is noted that merely counting the number of clusters may not suffice to quantify heterogeneity. The relative sizes of the clusters and the well-separated-ness of the clusters affect the heterogeneity. For the example above, a few phone numbers in a large collection of email addresses (e.g., column 214) may look like a distinct cluster, but does not impact the heterogeneity of the column as much as having a significant number of phone numbers in the large collection of email addresses (e.g., column 212). Again, customer or social security numbers (see the first few values in column 216) may look similar to a phone number. As such, the current heterogeneity measure as discussed below will reflect this overlap of sets of values, as well as is able to capture the idea that certain data yield clusters that are close to each other, and other data yield well-separated clusters. For the reasons described above, the present invention uses cluster entropy, rather than the number of clusters, as the starting basis for quantifying heterogeneity.

The present invention provides a method and apparatus for rapid identification of column heterogeneity. In order to clearly illustrate the present invention, the following data quality terminology and concepts will first be described. These terminologies and concepts are that of:

Hard clustering;
Cluster Entropy;
Soft clustering; and
Information Bottleneck (IB) method and rate distortion.

A hard clustering of a set of n points X is a partition $T=\{t_1, t_2, \ldots, t_k\}$ such that each point $x \in X$ is contained in exactly one clusters $t_j$ where each point in X is assigned to some cluster.

The cluster entropy is computed by assigning a "probability" to each cluster equal to the fraction of the data points it contains, and computing the entropy of the resulting distribution. Formally, let cluster $t_i$ have $n_i$ points, and set $p_i = n_i/n$. Then the Cluster Entropy (CE) of this clustering is the entropy of the cluster size distribution defined as:

$$CE(T) = -\Sigma p_i \ln p_i.$$

The "points" are then distributions, and they are assigned to clusters probabilistically rather than deterministically. This reflects the natural uncertainty in assigning points to clusters as shown in column 216 above.

Formally defined, a soft clustering of a set of n points X is a set of clusters $T=\{t_1, t_2, \ldots, t_k\}$ and a cluster membership distribution $p(T|x)$ for each point x, where $p(t|x)$ is the probability of assigning x to cluster t. Given the soft clustering, compute the quantity $I(T;X)$. The current invention uses an information bottleneck (IB) method, as described below, to compute a soft clustering of distributions.

The information bottleneck method takes as input a collection of distributions, expressed as joint distribution (X, Y). In the joint distribution, $x \in X$ is a particular distribution whose component dimensions are the elements of Y. The output is a cluster membership distribution for each x. Formally, this is represented as a conditional distribution $p(T|x)$ for each x, where each element $p(t|x)$ represents the conditional probability that x is placed in cluster $t \in T$.

In rate distortion theory, the mutual information $I(X;Y)$ between two random variables X, Y is defined as:

$$I(X;Y) = \Sigma_{x \in X} p(x) \Sigma_{y \in Y} p(y|x) \ln(p(y/x)/p(x)).$$

The mutual information $I(T;Y)$ represents the quality of the clustering; the higher this value, the better the quality. Of course, one can set $T=X$, which is equivalent to assigning each point its own cluster. Thus, a term to represent the compactness of the clustering is needed. In a hard clustering scenario, the number of clusters k, is the desired constraint. For soft clustering, data compression techniques express the measure of how "uncompressed" the clustering T is as $I(T;X)$ (broadly defined as cluster entropy). If all points are placed in a single cluster, then $I(T;X)=0$, representing maximum compression. Similarly, $I(T;X)=I(X;X)=H(X)$, when all points are placed in their own cluster. T represents the bottleneck that points are funneled through. The error of the funneling is minimized by maximizing $I(T;Y)$. The description complexity of the clustering is minimized by minimizing $I(T;X)$. An information bottleneck function that minimizes the error of the funneling while minimizing the complexity of the clustering is then introduced. The information bottleneck function is provided as an objective function defined by:

$$\Im[p(T|x)] = I(T;X) - \beta I(T;Y)$$

where $\beta$ is a Lagrange multiplier that controls the tradeoff between distortion and compression; the goal is then to minimize $\Im$. The mutual information $I(T;X)$ is the analog of k in a hard clustering. For the above example where points are assigned to exactly one cluster and all clusters have the same resulting cardinality, then $I(T;X)=\ln k$. In the above equation, each value of $\beta$ defines a different clustering tradeoff, and a different optimal solution. The choice of which clustering to use is then reduced to a choice of value for $\beta$. It may seem on the surface that all choices for $\beta$ are equally valid. However, there may exist an optimal value as described below.

Figure 3:
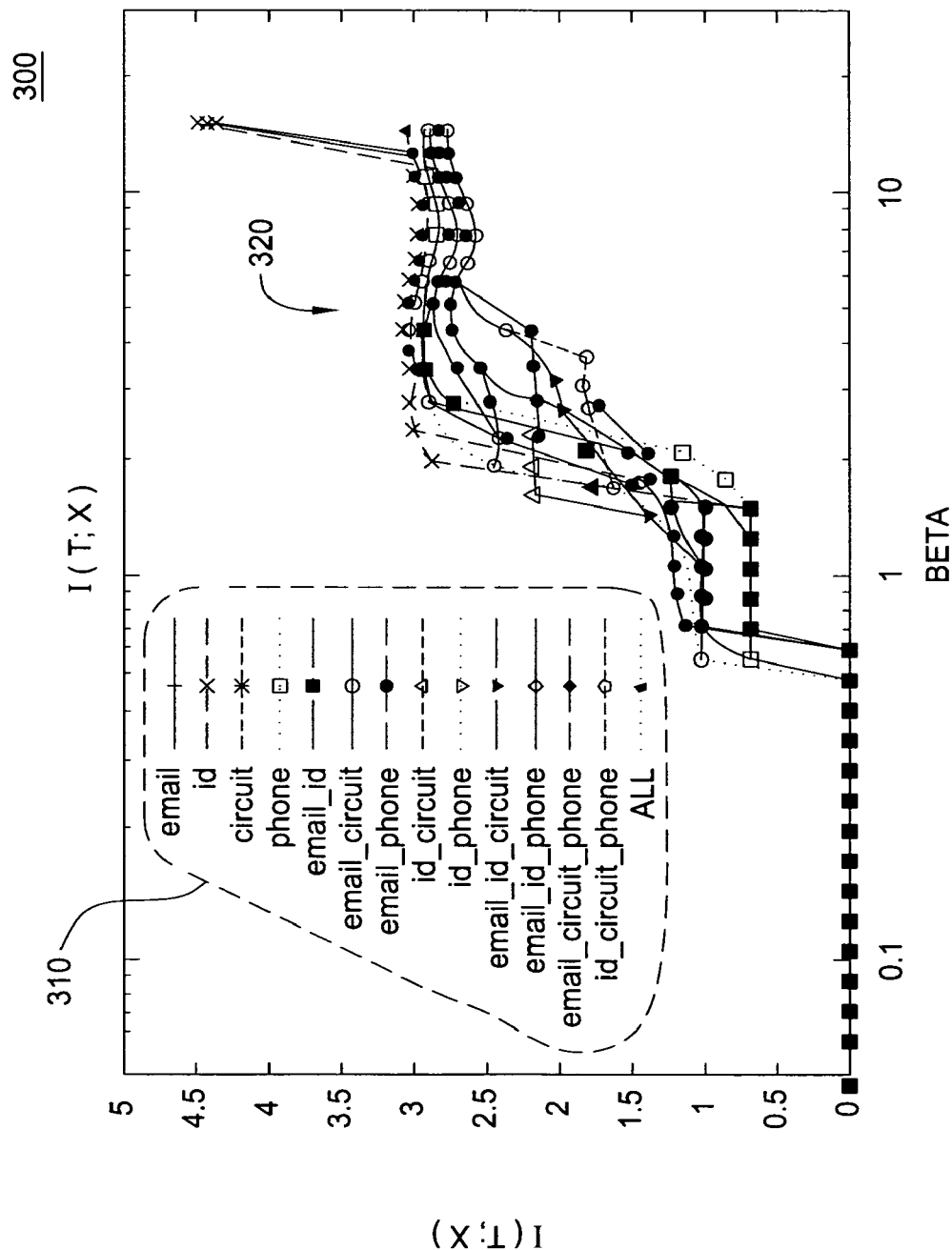
FIG. 3 illustrates cluster entropy as a function of $\beta$.

FIG. 3 illustrates $I(T;X)$ as a function of $\beta$ in a graph 300. A normalized version of $\beta$ is plotted on the x-axis. The $I(T;X)$ 320 for a large collection of data sets 310, ranging from the very homogenous to the very heterogeneous, is plotted on the y-axis. Note that for all the data sets, $I(T;X)$ exhibits a significant change in value close to a canonical value of $\beta$. This canonical value $\beta^*$ is given by the expression $\beta^* = H(X)/I(X;Y)$, where $H(X)$ is the entropy of X and is a function solely of the data itself. T appears nowhere in this expression. This is because the slope of the rate-distortion curve, which plots the value of $I(T;Y)$ versus $I(T;X)$ for an optimal clustering T as $\beta$ varies, is $1/\beta$ at any point. The values of $I(T;X)$ range between 0 and $H(X)$. The values of $I(T;Y)$ range between 0 and $I(X;Y)$. The values of $I(T;X)$ and $I(T;Y)$ are then normalized to range between 0 and 1. In the resulting curve, the point at which the slope of the curve is 1 represents the point of diminishing returns; it is the point at which the effort expended to achieve a better (normalized) clustering quality $I(T;Y)$ starts to exceed the increase in (normalized) data representation cost $I(T;X)$. A straightforward scaling argument shows that this point corresponds precisely to $\beta=\beta^*$.

Thus, in one embodiment, the canonical rule is to choose the optimal clustering for $\beta=\beta^*$. Furthermore, the number generated by this rule is an accurate predictor of data heterogeneity. Specifically, the relative ordering of $I(T;X)$ values obtained at $\beta=\beta^*$ is consistent with the expected relative heterogeneity of these data sets.

Another consideration for an accurate soft clustering of the data is to provide context, i.e. any clustering makes sense within a context. For example, a high concentration of points in a small range is significant only if viewed against a relatively sparse, larger background. In another example, the collection of strings in column 210, form a cluster only with respect to the set of all strings. If the background for this data were the set of all email addresses, then this set has no apparent unusual properties. In one embodiment, the method of the invention used for soft clustering of the data then includes addition of a background context.

For heterogeneity testing, an appropriate background is the space of all strings. This needs to be introduced into each data set in order to define the "bounding volume" of the space. Since the data are represented as distributions, the background may consist of random distributions, chosen from the space of all distributions. These are added to the data before soft clustering is performed, and are then removed.

In one embodiment, it is assumed that the data is represented as distributions over a domain. The input to a heterogeneity testing procedure is a column of data viewed as a collection of strings. To convert this to a distribution, the method first views each string as a (small) document. It then replaces this document by a normalized weighted vector of q-grams as described below. The resulting vector of q-grams is used to compute the optimal value $\beta^* = H(X)/I(X;Y)$. The background context is then added prior to determining the soft clusters. The added background is removed after the clusters are determined. The remaining data is used to construct well-separated clusters by merging clusters that are close, and to compute cluster entropy.

In one embodiment, q-grams are first constructed for all strings in X. In particular, 1- and 2-grams are constructed for all strings. If the set of q-grams are Y, for each q-gram y, let f(x,y) be the number of occurrences of y in x, and let p(y) be the fraction of strings containing y. A matrix S is then constructed. The rows of the matrix S are the strings of X and the columns are q-grams. The entries are in, $m_{xy}$=f(x,y)*w(y)/Z, where Z is a normalizing constant so that the sum of all entries in M is 1, and $$w(y)=H(p(y))=-p(y)\ln p(y)-(1-p(y))\ln(1-p(y)).$$

For the above example, a collection of background points are added to the data. Since the space being considered is the space of all d-dimensional distributions (the d-dimensional simplex), the data is sampled uniformly over this space. The uniform distribution over the d-dimensional simplex is a Dirichlet distribution, and thus a uniform sample from this space may be obtained by the following procedure. Sample d points $x_1, \ldots, x_d$ from an exponential distribution with parameter 1, and normalize the values by dividing each by $$\sum_{i=1}^{d} x_i.$$

The resulting d-vector is a uniform sample from the simplex. A uniform sample from an exponential distribution is computed by sampling r uniformly in [0 . . . 1] and returning the value ln(1/r). The background is generated by using a set of q-grams disjoint from the q-grams in Y, of the same cardinality as Y. Using the above procedure, |X| points are generated, yielding a matrix N that is then normalized so all entries sum to 1. Both S and N have dimension |X|×|Y|. The method then fixes a parameter 0<λ<1 (the mixing ratio) that controls the mixture of signal and background context. The final joint density matrix M is of dimension 2 |X|×2 |Y|, containing λS as its first |X| rows and |Y| columns and (1−λ)N as its last |X| rows and |Y| columns. Note that M is a valid joint distribution since its entries sum to 1. The notation used below refers to the rows of M as X and the columns as Y in what follows for clarity.

The present method then computes β* from the matrix M, using only the data rows and columns. Standard empirical estimator for entropy (which treats the normalized counts as fractions) is used. The information bottleneck can now be determined from M and β*. The information bottleneck algorithm is a generalization of the standard expectation-maximization method. Although the algorithm generates a soft clustering, it requires as input a target set of clusters (not all of which may be used). In one embodiment, the method specifies a very large number of clusters (|X|/2). Empirically, it is sufficient to find a point on the rate distortion curve. Note that the method does not need to fix a number of clusters in advance; the number of clusters that is supplied to the information bottleneck method is merely an artifact of the implementation and need only be a very loose upper bound. It may affect the running time of the algorithm but not the final heterogeneity measure computed. The output of this algorithm is a soft clustering T, specified as the conditional probabilities, p(T|x) from which the cluster masses p(T) and the cluster centers p(Y|t) can be derived using Bayes' Theorem and the conditional independence of T and Y given X as shown below:

$$p(t) = \sum_{x} p(t|x)p(x), \text{ and}$$

$$p(y|t) = \sum_{x} \frac{p(y|x)p(t|x)p(x)}{p(t)}.$$

In order to compute the heterogeneity of the resulting soft clustering, the method computes the quantity I(T;X) and reports this value.

Figure 4:
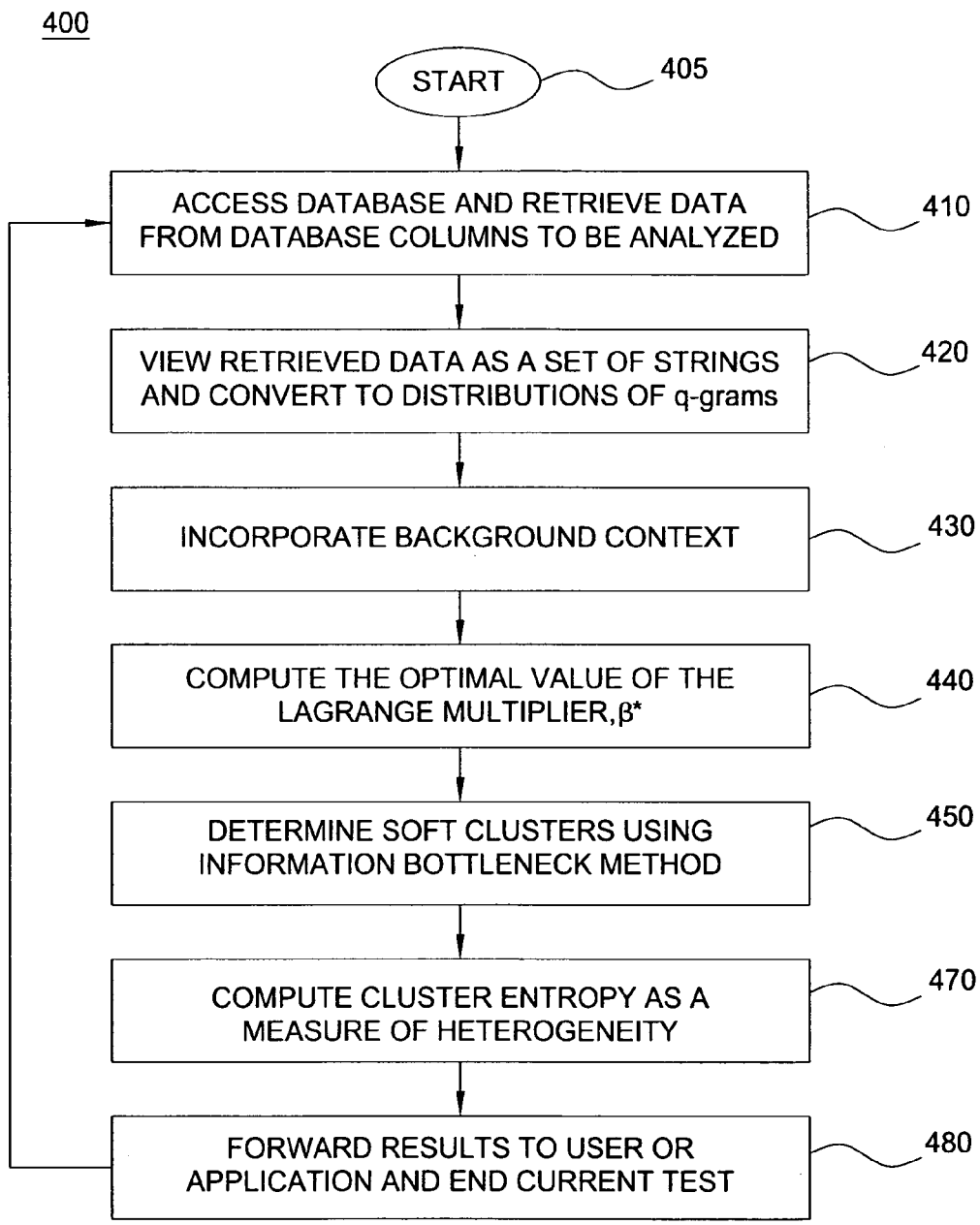
FIG. 4 illustrates a flowchart of a method for rapid identification of column heterogeneity.

FIG. 4 illustrates a flowchart of a method 400 for rapid identification of column heterogeneity. For example, a network analyst or user may implement method 400 for rapid identification of column heterogeneity, e.g., enabling a server to access columns of data in databases to be analyzed for heterogeneity.

Method 400 starts in step 405 and proceeds to step 410. In step 410, method 400 accesses a database and retrieves data from one or more database columns to be analyzed. For example, the server may access a database containing customer identifications. Note that the customer identification database may have been a database created by merging multiple databases used by various applications throughout an enterprise.

In step 420, method 400 views the column of data as a set of strings and converts the strings to distributions of q-grams. For example, the column of data may be viewed as a set of input strings X. If the set of q-grams are defined as Y, for each q-gram y, let f(x,y) be the number of occurrences of y in x, and let p(y) be the fraction of strings containing y. A matrix S is constructed with rows of the matrix the strings of X and the columns the q-grams. The entries of the matrix are $m_{xy}$=f(x, y)*w(y)/Z, where Z is a normalizing constant so that the sum of all entries in M is 1, and $$w(y)=H(p(y))=-p(y)\ln p(y)-(1-p(y))\ln(1-p(y)).$$

In step 430, method 400 incorporates background context. Background points are added to the data and the soft clusters are formed on the mix of data and background. The background is removed after the soft clusters are established. For the example above, a background is generated by using a set of q-grams disjoint from the q-grams in Y, of the same cardinality as Y. |X| points are generated, yielding a matrix N that is then normalized so all entries sum to 1. The method then fixes a parameter λ to be used as a mixing ratio (with range between zero and 1) to control the mixture of signal and background context. The final joint density matrix M is then of dimension 2 |X|×2 |Y|, containing λS as its first |X| rows and |Y| columns, and (1−λ)N as its last |X| rows and |Y| columns.

In step 440, method 400 computes the optimal value of the Lagrange multiplier β*. For the above example, the method determines β* from the matrix M, by computing the entropy from the data itself and finding the value of the Lagrange multiplier where the slope of the rate distortion curve is close to 1.

In step 450, method 400 determines soft clusters using an information bottleneck method. For the example above, the output of the information bottleneck algorithm is a soft clustering T, specified as the conditional probabilities p(T|x).

In step 470, method 400 computes a cluster entropy as a measure of heterogeneity, e.g., computing the heterogeneity of the soft clustering.

In step 480, method 400 forwards the results to the user as an output and ends the current heterogeneity test. Alternatively, the method may proceed back to step 410 to begin a new test for another column.

Figure 5:
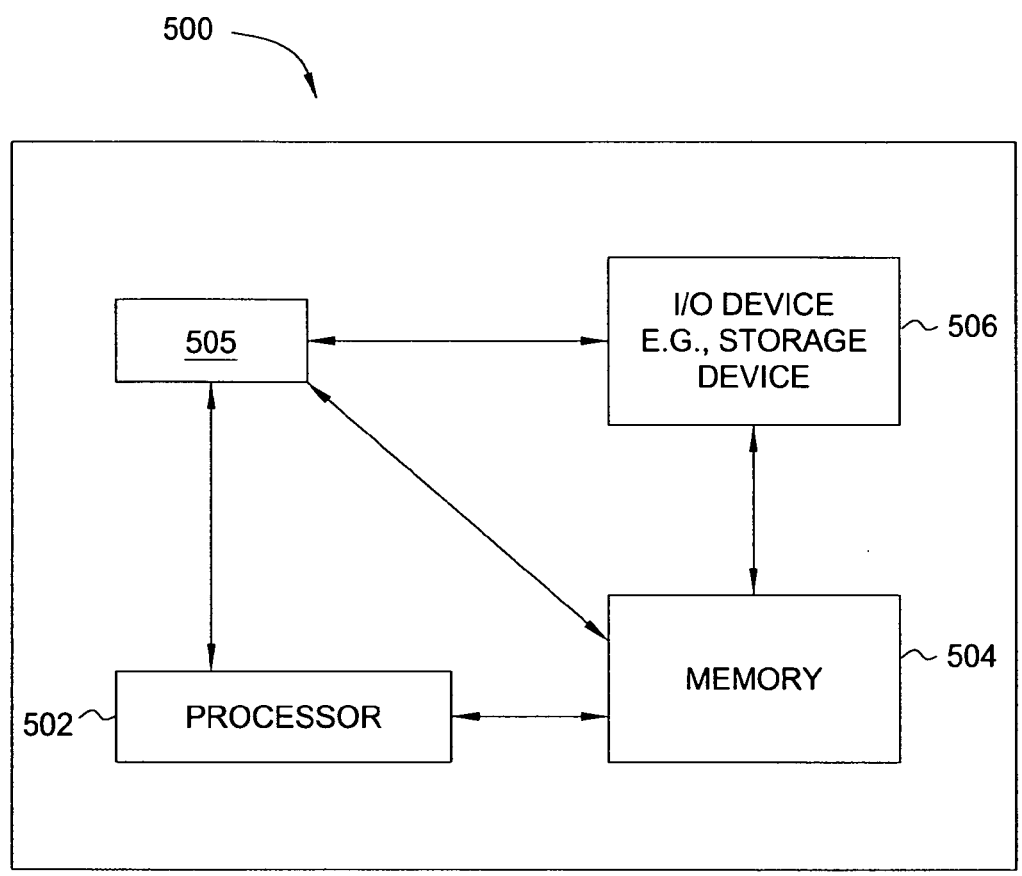
FIG. 5 illustrates a high-level block diagram of a general-purpose computer suitable for use in performing the functions described herein.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for rapid identification of column heterogeneity, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 505 for rapid identification of column heterogeneity can be loaded into memory 504 and executed by processor 502 to implement the functions as discussed above. As such, the present method 505 for rapid identification of column heterogeneity (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method for identifying data heterogeneity, the method comprising:
   receiving data associated with a column in a database;
   computing a cluster entropy solely for the data of the column as a measure of data heterogeneity, wherein the cluster entropy is computed by:
      determining a plurality of soft clusters from the data;
      assigning a probability to each of the plurality of soft clusters equal to a fraction of data points of the data that each of the plurality of soft clusters contains; and
      computing the cluster entropy based on a resulting distribution of the plurality of soft clusters, wherein the entropy of the resulting distribution comprises the cluster entropy;
   determining, via a processor, whether the data of the column is heterogeneous in accordance with the cluster entropy; and
   providing a determination of whether the data of the column is heterogeneous as an output to a user.

2. The computer-implemented method of claim 1, wherein the data points comprise strings of input data that are converted into a plurality of distributions of q-grams.

3. The computer-implemented method of claim 1, wherein the determining the plurality of soft clusters employs an information bottleneck method.

4. The computer-implemented method of claim 3, wherein the computing the cluster entropy further comprises:
   incorporating background context data.

5. The computer-implemented method of claim 4, wherein the computing the cluster entropy further comprises:
   computing an optimal tradeoff parameter $\beta^*$, for controlling a tradeoff between distortion and compression in clustering the data points of the data into the plurality of clusters.

6. A non-transitory computer-readable storage medium having stored thereon a plurality of instructions, the plurality of instructions including instructions which, when executed by a processor, cause the processor to perform a method for identifying data heterogeneity, comprising:
   receiving data associated with a column in a database;
   computing a cluster entropy solely for the data of the column as a measure of data heterogeneity, wherein the cluster entropy is computed by:
      determining a plurality of soft clusters from the data;
      assigning a probability to each of the plurality of soft clusters equal to a fraction of data points of the data that each of the plurality of soft clusters contains; and
      computing an entropy of a resulting distribution of the plurality of soft clusters, wherein the entropy of the resulting distribution comprises the cluster entropy; and
   determining whether the data of the column is heterogeneous in accordance with the cluster entropy.

7. The non-transitory computer-readable storage medium of claim 6, wherein the data points comprise strings of input data that are converted into a plurality of distributions of q-grams.

8. The non-transitory computer-readable storage medium of claim 6, wherein the determining the plurality of soft clusters employs an information bottleneck method.

9. The non-transitory computer-readable storage medium of claim 8, wherein the computing the cluster entropy further comprises:
   incorporating background context data.

10. The non-transitory computer-readable storage medium of claim 9, wherein the computing the cluster entropy further comprises:
    computing an optimal tradeoff parameter $\beta^*$, for controlling a tradeoff between distortion and compression in clustering the data points of the data into the plurality of clusters.

11. The non-transitory computer-readable storage medium of claim 6, further comprising:
    providing a determination of whether the data is heterogeneous as an output.

12. An apparatus for identifying data heterogeneity, the apparatus comprising:
    a processor; and
    a non-transitory computer-readable storage medium in communication with the processor, the computer-readable medium having stored thereon a plurality of instructions, the plurality of instructions including instructions which, when executed by the processor, cause the processor to perform a method comprising:
       receiving data associated with a column in a database;
       computing a cluster entropy solely for the data of the column as a measure of data heterogeneity, wherein the cluster entropy is computed by:
          determining a plurality of soft clusters from the data;
          assigning a probability to each of the plurality of soft clusters equal to a fraction of data points of the data that each of the plurality of soft clusters contains; and
          computing an entropy of a resulting distribution of the plurality of soft clusters, wherein the entropy of the resulting distribution comprises the cluster entropy; and determining whether the data of the column is heterogeneous in accordance with the cluster entropy.

13. The apparatus of claim 12, wherein the data points comprise strings of input data that are converted into a plurality of distributions of q-grams.

14. The apparatus of claim 12, wherein the determining whether the data of the column is heterogeneous by employing an information bottleneck method.

15. The apparatus of claim 14, wherein the cluster entropy is further computed by:
incorporating background context data.

16. The apparatus of claim 15, wherein the cluster entropy is further computed by:
computing an optimal tradeoff parameter $\beta^*$, for controlling a tradeoff between distortion and compression in clustering the data points of the data into the plurality of clusters.

* * * * *